United States Patent
Marioni

[11] Patent Number: 5,160,431
[45] Date of Patent: Nov. 3, 1992

[54] FILTER FOR AQUARIUMS
[75] Inventor: Elio Marioni, Dueville, Italy
[73] Assignee: Askoll S.p.A., Povolaro Sud-Dueville, Italy
[21] Appl. No.: 709,475
[22] Filed: Jun. 3, 1991
[30] Foreign Application Priority Data Jun. 14, 1990 [IT] Italy ............... 41629 A/90

[51] Int. Cl.$^5$ ............... A01K 63/04
[52] U.S. Cl. ............... 210/169; 210/416.2; 119/5
[58] Field of Search ............... 210/169, 416.2; 119/4, 119/5

[56] References Cited

U.S. PATENT DOCUMENTS

| | | | |
|---|---|---|---|
| Re. 28,116 | 8/1974 | Cohen | 119/5 |
| 3,247,826 | 4/1966 | Girard | 119/5 |
| 3,516,544 | 6/1970 | Sesholtz | 210/169 |
| 4,098,230 | 7/1978 | Jackson | 119/5 |
| 4,151,810 | 5/1979 | Wiggins | 119/5 |
| 4,897,188 | 6/1990 | Ogawa | 119/5 |
| 4,957,623 | 9/1990 | Henzlik | 210/169 |

*Primary Examiner*—Stanley S. Silverman
*Assistant Examiner*—Robert James Popovics
*Attorney, Agent, or Firm*—Guido Modiano; Albert Josif

[57] ABSTRACT

The improved filter particularly for aquariums comprises one or more perforated plates which are arrangeable side by side on an aquarium bottom and which are provided with protrusions which keep them raised so as to form an interspace. The plates are coverable by gravel or other material, and at least one of them is connected to a tube for drawing water from the interspace. Each of the plates is provided with elements suitable for channeling the drawn water toward at least one passage which is provided with a cock suitable for adjusting its flow.

3 Claims, 2 Drawing Sheets

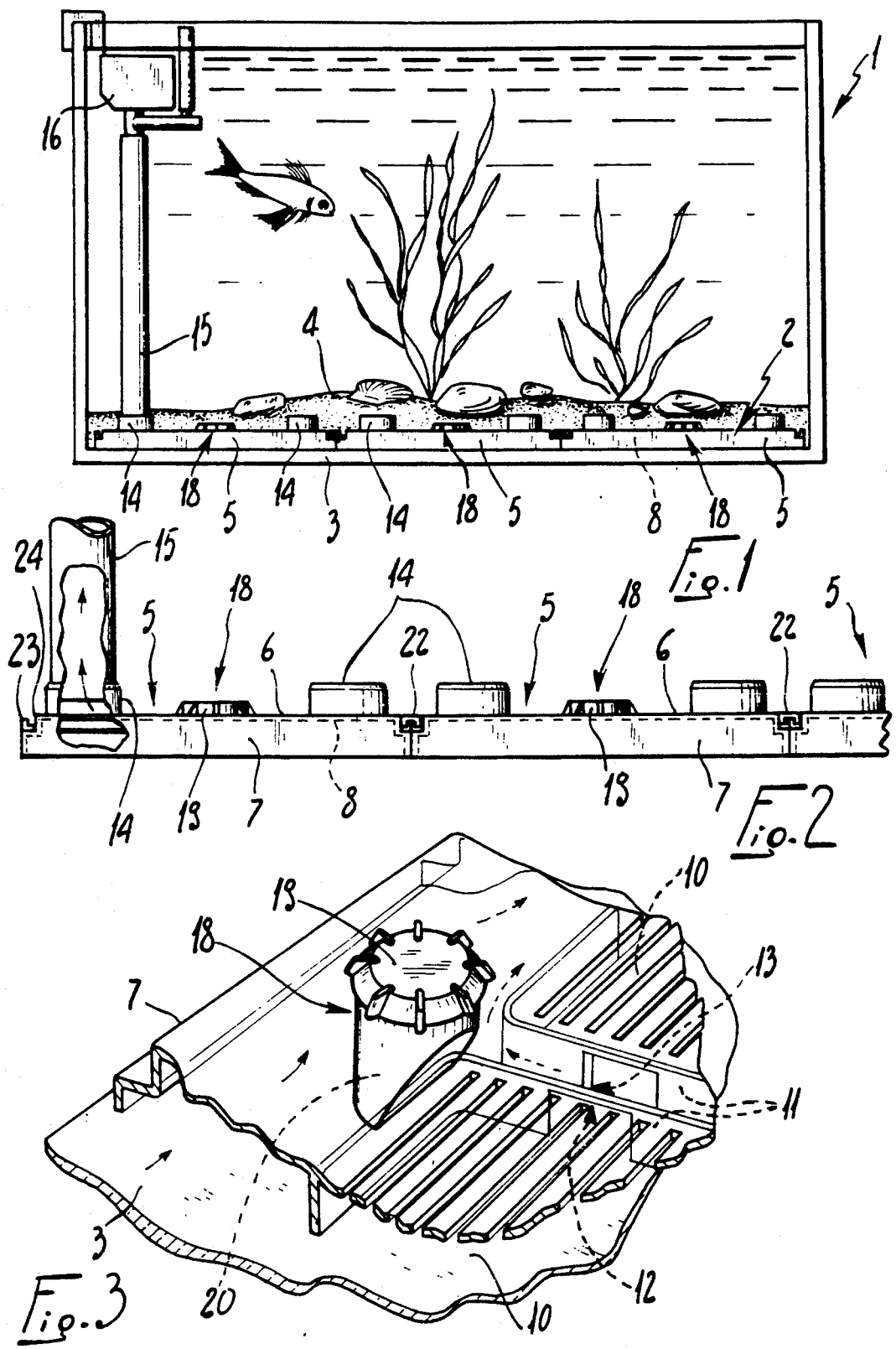

FILTER FOR AQUARIUMS

BACKGROUND OF THE INVENTION

The present invention relates to an improved filter, particularly of the type which is installed in aquariums and buried under sand or gravel.

Each of these filters is in practice constituted by one or more plates which are provided with a plurality of slots and are arranged side by side on the bottom of an aquarium so as to form an interspace by virtue of the presence of lower protrusions with which they are provided.

Said plates, which are preferably made of plastic material or of another material which does not degrade in the course of time, are then covered by a layer of gravel, sand or other material, and a recirculation pump is connected to a hole of a plate by means of a suction tube and thus draws the water from the bottom, filtering it through the sand and recirculating it in the upper part.

The suction tube is generally arranged in a corner of the aquarium, and since current commercially available plates are in practice constituted by a uniform filtration grid, water is drawn where it encounters less resistance and thus in a very small region which is adjacent to the suction tube.

This naturally negatively affects the operation of the filter, and thus water recirculation occurs only in small regions of the aquarium.

Further negative effects occur due to the deposition of impurities confined at the regions adjacent to the suction tube.

SUMMARY OF THE INVENTION

The aim of the present invention is to provide an improved filter which ensures a constant suction of water from each region of the aquarium.

A consequent primary object is to provide a filter which allows to adjust the flow of water arriving from each region of the aquarium.

Another important object is to provide a filter which does not have particular installation problems with respect to known types and which allows a simple and rapid adjustment of the water flow which affects it.

Another object is to improve the recirculation of the water inside the aquarium.

Not least object is to provide a filter which can be manufactured at low cost with conventional production facilities.

This aim, these objects and others which will become apparent hereinafter are achieved by an improved filter of the type which comprises one or more perforated plates which are arrangeable side by side on an aquarium bottom and which are provided with protrusions suitable for forming an interspace, said plates being coverable by gravel or other material, at least one of said plates being connected to a tube for drawing water from said interspace, said filter being characterized in that each of said plates is provided, in a downward position, with elements suitable for channeling the drawn water toward at least one passage which has cutoff means suitable for adjusting its flow.

BRIEF DESCRIPTION OF THE DRAWINGS

Further characteristics and advantages of the invention will become apparent from the detailed description of an embodiment thereof, illustrated only by way of non-limitative example in the accompanying drawings, wherein:

FIG. 1 is a side view of an aquarium provided with the improved filter according to the invention;

FIG. 2 is an enlarged side view of the filter of FIG. 1;

FIG. 3 is an enlarged perspective detail view of the filter of FIG. 1;

DESCRIPTION OF THE PREFERRED EMBODIMENTS

Figure 4:
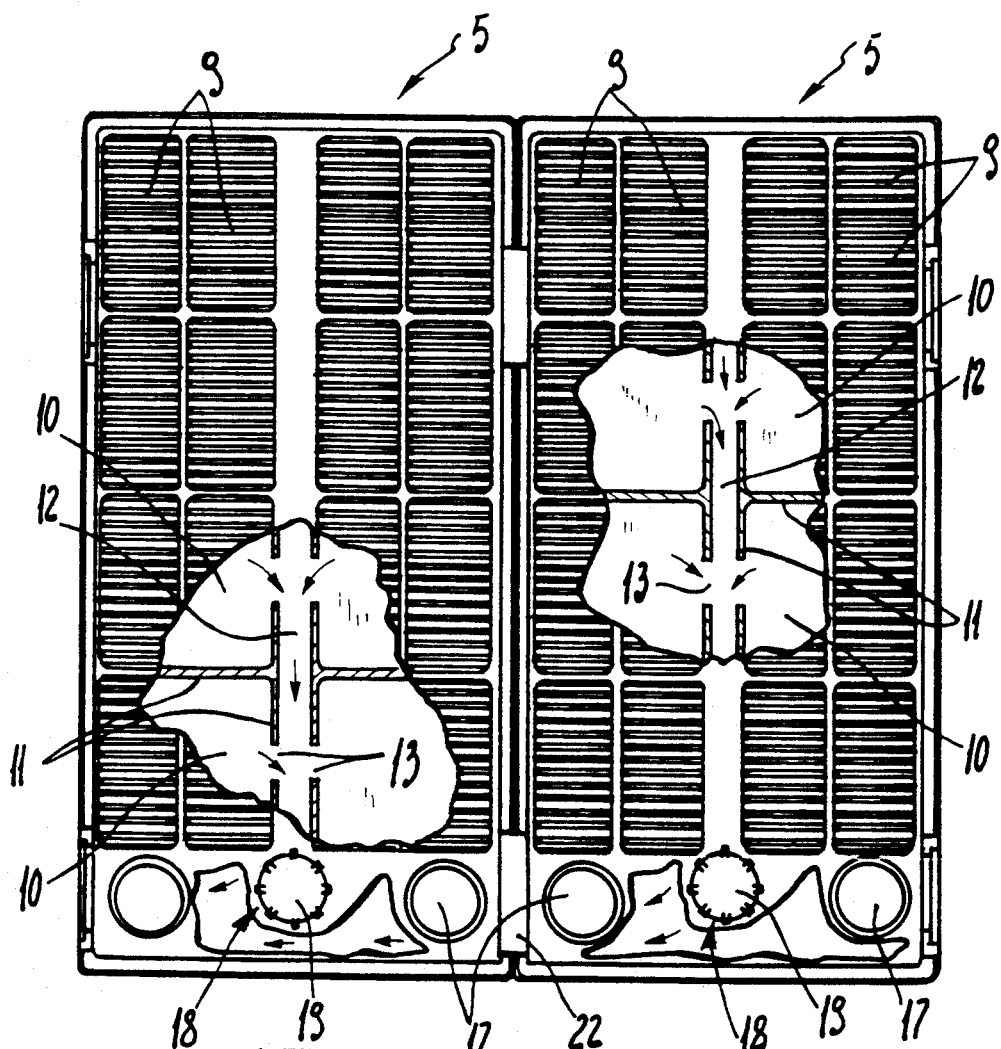
FIG. 4 is a partially sectional plan view of two plates which compose the filter of FIG. 1.
Figure 5:
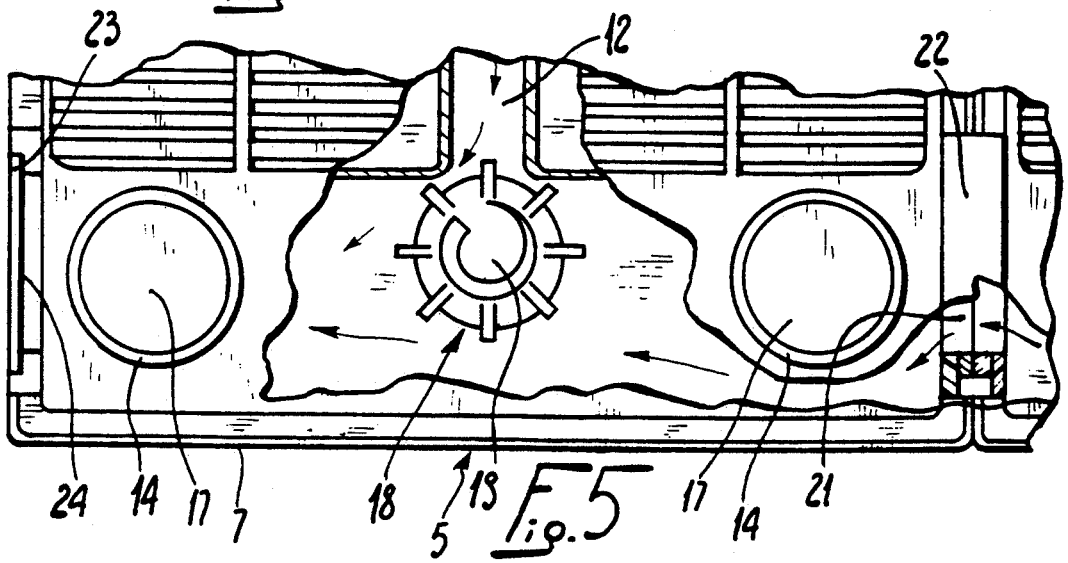
FIG. 5 is an enlarged detail view of FIG. 4.

With reference to the above figures, the reference numeral 1 generally indicates an aquarium equipped with a filter 2 which rests on the aquarium bottom 3 and which is covered by gravel 4.

Said filter 2 comprises, in this case, three flanking plates 5, each of which comprises a planar supporting surface 6 and lower perimetric walls 7 which are suitable for raising the surface 6 above the bottom 3, thereby defining an interspace 8 between said surface and the bottom 3.

Said planar surface 6 is conveniently provided with slots 9 through which the water of the aquarium 1 is drawn into the interspace 8.

Said interspace 8 is conveniently divided into areas 10 by partitions 11 which extend from the surface 6 and define, in a longitudinal median region, a conveyance passage 12.

Advantageously, said passage 12 is connected to the areas 10 by means of openings 13 defined in the partitions 11.

At the end region, adjacent to two corners, tubular manifolds 14 extend from each plate 5; a suction tube 15, connected to a recirculation pump 16 which is arranged in the upper region of the aquarium 1, can be inserted in one or more of said manifolds.

Conveniently, the unused manifolds 14 are plugged with plugs 17.

A cock 18 is arranged in the same region of each plate 5 which is provided with the manifolds 14, at the end of the passage 12 which ends at said region, and comprises an actuation knob 19 which is arranged above the plate 5 and a cutoff element 20 which is substantially constituted by a cylinder which is cut along a plane which is inclined with respect to the cylinder axis.

The rotation of the cock 18 allows to throttle the flow which is drawn from the passage 12 through the suction tube 15.

Conveniently, each plate 5 has openings 21 on the wall 7 to be flanked; said openings are arranged at the regions provided with the manifolds 14, so as to allow the passage of water from one to the other.

The various plates 5 are fixed to one another by means of clips 22 which engage fastening protrusions 23 which extend upward from seats 24 arranged in the lateral regions.

As regards the operation of the filter 2, said operation is very simple and substantially consists in adjusting the various cocks 18 so as to calibrate the opening of the passages 12, consequently adjusting the flow of water arriving from the various regions 10.

The cocks 18 must be opened so that the suction of the plate which is furthest from the suction tube 15 is facilitated with respect to that of the nearest plate.

The flow of water is indicated by the arrows of figure 4.

In this manner, the water flow rate through the filter at all of the regions of the aquarium above the planar surface 6 is generally constant Filtration and water recirculation are thus optimized.

In practice it has thus been observed that the invention has achieved the intended aim and objects.

The plates 5 are furthermore manufactured, like current ones, by molding plastic material and therefore do not entail greater technical difficulties in manufacture.

Said plates can be manufactured in various sizes and composed in a number suitable for covering the bottom of the aquarium.

Suction can be performed at any point of the aquarium, in one or more points, with one or more pumps.

The invention thus conceived is susceptible to numerous modifications and variations, all of which are within the scope of the inventive concept.

All the details may furthermore be replaced with other technically equivalent elements.

In practice, the materials employed, so long as compatible with the contingent use, as well as the dimensions, can be any according to the requirements.

I claim:

1. An improved filter comprising a perforated plate (5) which is arrangeable on an aquarium bottom (3), said perforated plate comprising:

a substantially planar supporting surface (6);

means (7) for supporting said planar supporting surface above said aquarium bottom so as to define an interspace (8) between said planar supporting surface and said aquarium bottom;

a plurality of slots (9) which are provided in said planar supporting surface for allowing liquid flow therethrough into said interspace;

partition means (11) which are connected to said planar supporting surface and which protrude therefrom so as to divide said interspace into: a plurality of separate areas (10); a longitudinal passage (12); and an end region which is in communication with said longitudinal passage; and a plurality of openings (13) for allowing liquid flow from said plurality of separate areas to said longitudinal passage;

the filter further comprising:

at least one manifold element (14) provided in said planar supporting surface at said end region;

at least one recirculation pump (16) connected to said manifold for pumping liquid from said end region back into said aquarium; and cutoff means (20) for throttling liquid flow from said longitudinal passage into said end region.

2. A filter according to claim 1, wherein said cutoff means comprise a cock (18) which is rotatably connected to said planar supporting surface and which is provided with an upper actuation knob (19) and a lower cutoff element (20) which extends into said interspace at a junction point between said longitudinal passage and said end region, said cutoff element being constituted by a cylindrical element having an axis and being cut along a plane which is oblique with respect to said axis.

3. A filter according to claim 1, comprising a plurality of said perforated plates (5) which are mutually arrangeable side by side on said aquarium bottom, the end regions of said plurality of perforated plates being in mutual communication by means of aligned openings (21) therebetween, the filter further comprising a plurality of said manifold elements (14) and a plurality of recirculation pumps (16) connected to said plurality of manifold elements.

* * * * *